United States Patent
Poisner

(10) Patent No.: US 6,421,765 B1
(45) Date of Patent: *Jul. 16, 2002

(54) METHOD AND APPARATUS FOR SELECTING FUNCTIONAL SPACE IN A LOW PIN COUNT MEMORY DEVICE

(75) Inventor: David I. Poisner, Folsom, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,498

(22) Filed: Jun. 30, 1999

(51) Int. Cl.⁷ .............................................. G06F 13/00
(52) U.S. Cl. ........................ 711/145; 711/100; 711/154; 711/170
(58) Field of Search ................................. 711/100, 109, 711/110, 111, 145, 154, 170

(56) References Cited

U.S. PATENT DOCUMENTS

| | | | | |
|---|---|---|---|---|
| 4,797,812 A | * | 1/1989 | Kihara | 710/26 |
| 5,060,192 A | * | 10/1991 | Young et al. | 365/156 |
| 5,179,534 A | * | 1/1993 | Pierce et al. | 365/189.01 |
| 5,369,752 A | * | 11/1994 | Giles et al. | 711/165 |
| 5,390,317 A | * | 2/1995 | Weiss et al. | 711/103 |
| 6,263,473 B1 | * | 7/2001 | Kamada | 714/795 |

OTHER PUBLICATIONS

Low Pin Count (LPC) Interface Specification, Revision 1.0, Sep. 29, 1997.

* cited by examiner

Primary Examiner—Tuan V. Thai
(74) Attorney, Agent, or Firm—Blakely, Sokoloff, Taylor & Zafman LLP

(57) ABSTRACT

The present invention is an apparatus and method for selecting one of a first and a second storage element in response to a control signal issued by a processor in a low pin count device. The apparatus comprises a decoder to receive the control signal and an address signal having a select bit indicative of one of the first and the second storage elements. The decoder generates a select signal to access one of the first and the second storage elements based on the select bit.

21 Claims, 4 Drawing Sheets

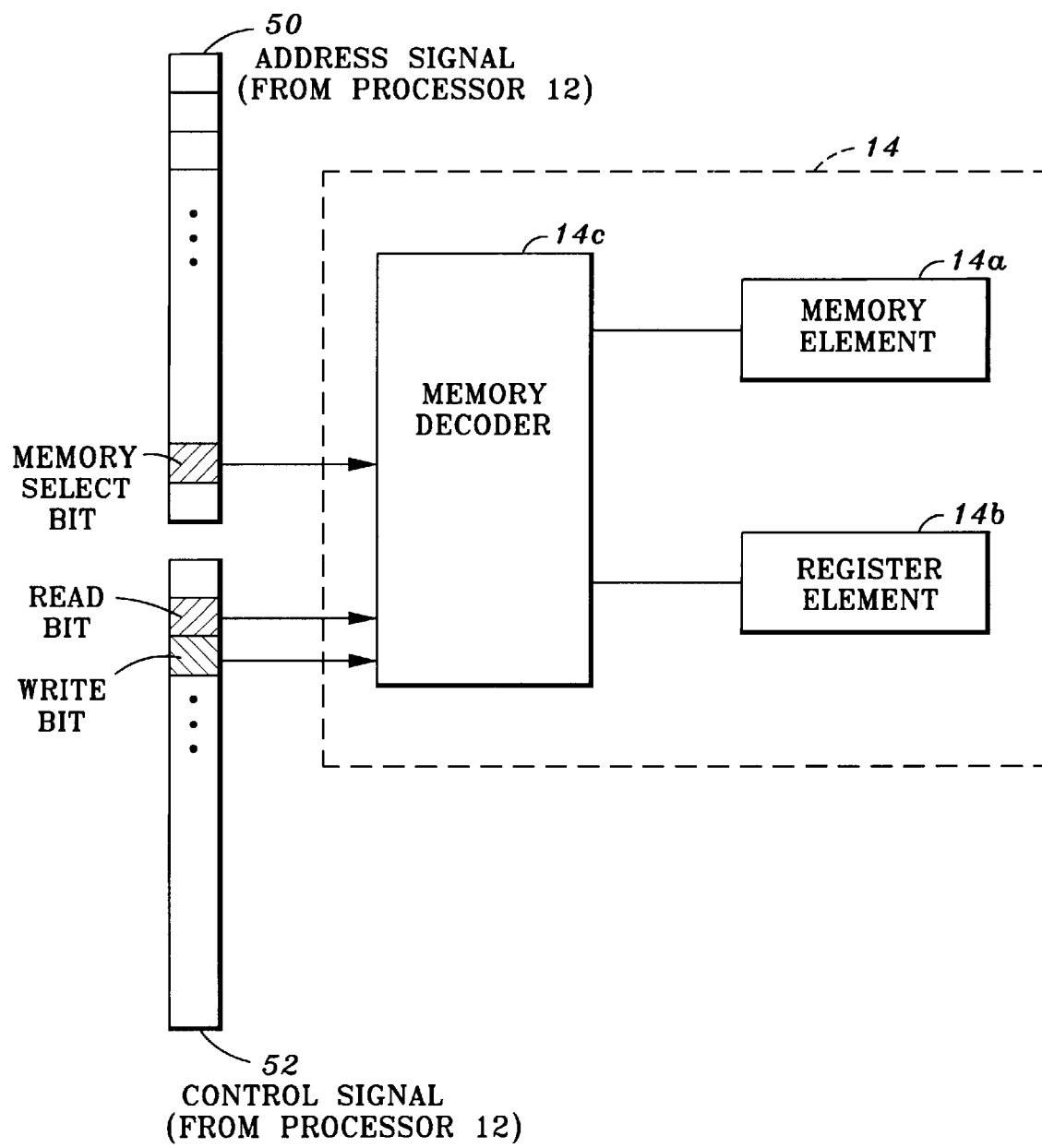

| READ BIT | WRITE BIT | MEMORY SELECT BIT | OPERATION |
|---|---|---|---|
| 0 | 0 | 0 | NO CYCLE |
| 0 | 0 | 1 | NO CYCLE |
| 0 | 1 | 0 | WRITE TO REGISTER LOCATION |
| 0 | 1 | 1 | WRITE TO MEMORY LOCATION |
| 1 | 0 | 0 | READ FROM REGISTER LOCATION |
| 1 | 0 | 1 | READ FROM MEMORY LOCATION |
| 1 | 1 | 0 | INVALID |
| 1 | 1 | 1 | INVALID |

*FIG. 3A*

| READ/$\overline{WRITE}$ BIT | MEMORY SELECT BIT | OPERATION |
|---|---|---|
| 0 | 0 | WRITE TO REGISTER LOCATION |
| 0 | 1 | WRITE TO MEMORY LOCATION |
| 1 | 0 | READ FROM REGISTER LOCATION |
| 1 | 1 | READ FROM MEMORY LOCATION |

METHOD AND APPARATUS FOR SELECTING FUNCTIONAL SPACE IN A LOW PIN COUNT MEMORY DEVICE

BACKGROUND OF THE INVENTION

1. Field of the Invention

The present invention relates generally to memory in processor-based or microcontroller-based systems, and more particularly, to an apparatus and method of selecting functional space in a low pin count memory device.

2. Description of the Related Art

In processor-based systems such as computers, an address space may correspond to several functional spaces. To allow the processor to access these functional spaces, extra signals or signal lines are used. For example, a dedicated pin is typically provided on a chip so as to access a separate functional space in a memory component, such as register space. Such a separate functional space in the memory component is typically mapped to the same address space as the main memory, i.e., to memory space. This mapping scheme presents several problems, the most significant of which is the resulting error created when an access to the main memory is mapped to that intended for the register space. The implementation of a dedicated pin for accessing one of several functional spaces is particularly problematic in Low Pin Count (LPC) (refer to http://developer.intel.com/design/chipsets/industry/lpc_100.pdf) memory devices, as a minimal number of pins are implemented in these devices so as to reduce the requirements for space, cost and testing procedures.

Accordingly, there is a need in the technology for an apparatus and method for overcoming the aforementioned problem. In particular, there is a need for an apparatus and method for allocating functional space in an LPC memory device so as to overcome the aforementioned problem.

BRIEF SUMMARY OF THE INVENTION

The present invention is an apparatus and method for selecting one of a first and a second storage element in response to a control signal issued by a processor in a low-pin count device. The apparatus comprises a decoder to receive the control signal and an address signal having a select bit indicative of one of the first and the second storage elements. The decoder generates a select signal to access one of the first and the second storage elements based on the select bit.

BRIEF DESCRIPTION OF THE DRAWINGS

FIG. 2 illustrates a detailed schematic diagram of the memory module 14 in which the present invention is implemented.

FIG. 3A is a logic diagram illustrating the principles of the present invention.

FIG. 3B is a logic diagram illustrating an alternate embodiment of the present invention.

DETAILED DESCRIPTION OF THE PREFERRED INVENTION

The present invention utilizes a memory configuration bit located in an address to indicate the use of either of the memory space or the register space in a low pin count (LPC) memory device, for the associated operation. In one embodiment, the memory select bit is located adjacent the most significant address bit in the address.

Figure 1:
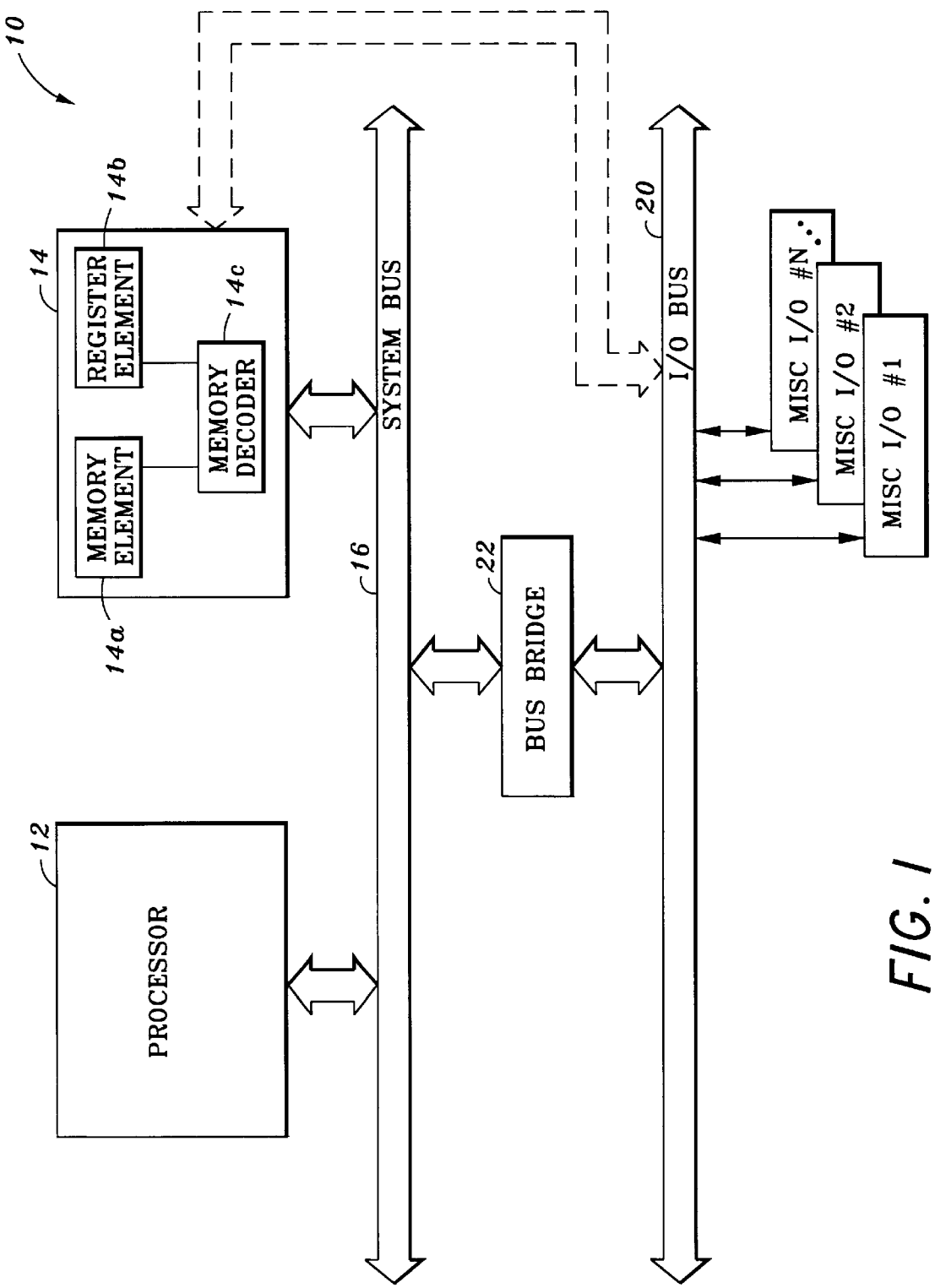
FIG. 1 is a system block diagram of an exemplary LPC processor system in which the apparatus and method of the present invention is used.

The present embodiment is described in reference to a processor system 10. FIG. 1 illustrates an exemplary LPC processor system 10 which implements the processes of the present invention. The processor system 10 comprises a processor 12 (such as a central processing unit) and a memory module 14. The memory module 14 includes a standard memory location 14a, a register location 14b and a memory decoder 14c. In one embodiment, the memory module 14 is a main memory that may be implemented by a random access memory (RAM) or a flash memory or a combination thereof. The processor 12 and memory module 14 are coupled to a system bus 16. In one alternate embodiment, the memory module 14 is coupled to an I/O bus 20. The processor system 10 may also include various I/O and peripheral modules (MISC I/O #1, #2, . . . #N) which are coupled along the I/O bus 20 that is in turn coupled to the system bus 16 via a bus bridge 22. Examples of the peripheral modules include a console, a printer and a mouse. In one embodiment, the processor 12 includes any one of the x86, Pentium™, Pentium II™ and Pentium Pro™ microprocessors as marketed by Intel Corporation. It is understood by one of ordinary skill in the technology that the present invention can be implemented in any processor-based system.

FIG. 2 illustrates a detailed schematic diagram of the memory module 14 in which the present invention is implemented. As shown, an address 50 issued by the processor 12 in an LPC device, is A bits long, where in one embodiment, A comprises bits A1–A21 and bits A22–A32. In one embodiment, bits A1–A21 are the address bits, with A1 being the least significant address bit, A21 being the most significant address bit and A22–A32 being additional information-bearing bits. In the embodiment as implemented in an LPC device, flash memory in the firmware hub is typically divided into two zones: the first for storing Basic Input/Output System (BIOS) code and data, and the second, typically referred to as feature, is an alias to the memory space, such as memory element 14a. The second zone provides a predetermined portion of register space, such as register element 14b.

In one embodiment, the present invention utilizes bit A22 as a memory select bit, to indicate if a corresponding operation is intended for the memory space or element 14a or the register space or element 14b. As described in the present embodiment, the memory select bit (e.g., A22) is located adjacent to the most significant address bit (e.g., A21). However, it is understood that in alternate embodiments, the memory configuration bit may be located in any of the additional information-bearing bits (e.g., A22–A32).). It is understood that in alternate embodiments, A may comprise any predetermined number of bits sufficient for address identification.

In addition, a control signal 52 issued by the processor includes at least two bits, one of which may be used to indicate if the corresponding cycle is a read operation while another bit may be used to indicate if the corresponding cycle is a write operation (see FIG. 3A). In alternate embodiments, a single bit in the control signal 52 may be used to indicate if the corresponding cycle is a read or write operation (see FIG. 3B). The address 50 and the control signal are both forwarded to the memory decoder 14c which decodes the address 50 and determines if the cycle if the operation associated with the address is intended to access the memory location 14a or the register location 14b, and if the cycle is a read or a write operation.

FIG. 3A is a logic diagram illustrating the principles of the present invention. In this embodiment, separate bits in the control signal 52 are used to indicate if the operation associated with the address is a read or a write operation. For discussion purposes, the associated bits will hereinafter be referred to as the read and the write bits. When the read bit is true (or 1), it indicates that the associated operation involves a read operation. When the write bit is true (or 1), it indicates that the associated operation involves a write operation. However, it is understood that a single bit may be used to represent the read/write operation status, as shown in FIG. 3B.

As shown in FIG. 3A, when the read and write are both zero, there is no associated cycle or operation, regardless of the state of the memory configuration bit (e.g., A22). When the read bit is false (or 0) and the write bit is true (or 1), then the associated operation is a write to the register location 14c if the memory configuration bit is false (or 0). When the read bit is false (or 0) and the write bit is true (or 1), then the associated operation is a write to the memory location 14b if the memory configuration bit is true (or 1).

When the read bit is true (or 1) and the write bit is false (or 0), then the associated operation is a read from the register location 14c if the memory configuration bit is false (or 0). When the read bit is true (or 1) and the write bit is false (or 0), then the associated operation is a read from the memory location 14b if the memory configuration bit is true (or 1).

Finally, when the read and write are both true (or 1), the associated operation is invalid, regardless of the state of the memory configuration bit (e.g., A22).

FIG. 3B is a logic diagram illustrating an alternate embodiment of the present invention. In this embodiment, a single bit in the control signal 52 is utilized to represent the read/write status associated with an address. As shown, when the read/write bit is false (or 0), the associated operation is a write operation. Conversely, when the read/write bit is true (or 1), the associated operation is a read operation.

In addition, if the read/write bit is false (or 0), and the memory configuration bit is 0, then the associated operation is a write to the register location 14b. If the read/write bit is false (or 0), and the memory configuration bit is 1, then the associated operation is a write to the memory location 14a.

If the read/write bit is true (or 1), and the memory configuration bit is 0, then the associated operation is a read from the register location 14b. If the read/write bit is true (or 1), and the memory configuration bit is 1, then the associated operation is a read from the memory location 14a.

Figure 4:
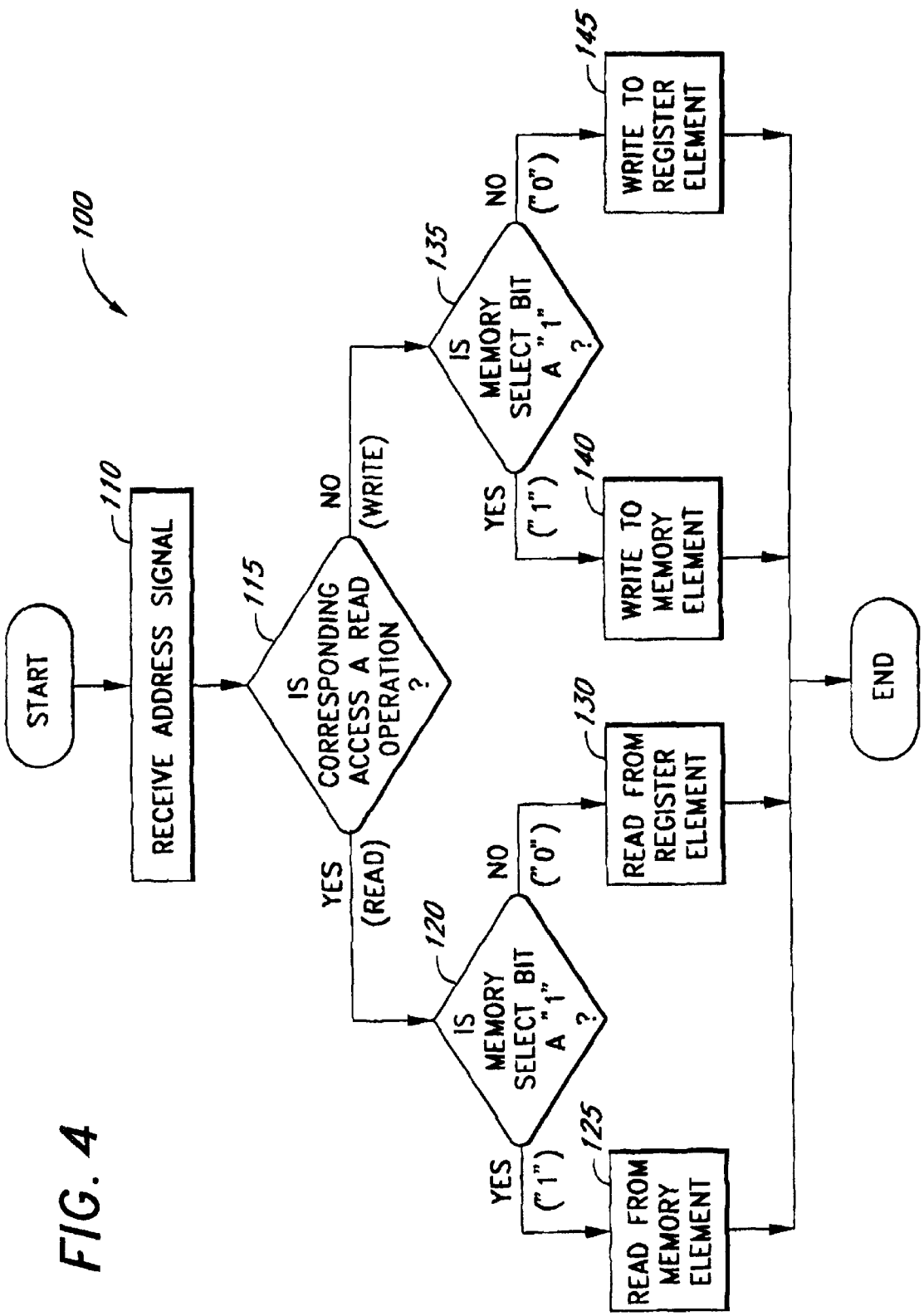
FIG. 4 is a flow chart illustrating one embodiment of the process flow of the present invention.

In an alternate embodiment, the address 50 (see FIG. 2) may include information representative of whether access associated with the address 50 is a READ or a WRITE operation. In this embodiment, the decoder, such as memory decoder 14c will decode the address signal to determine the type of access associated with the address 50, prior to performing the process of the invention. FIG. 4 is a flow chart illustrating one embodiment of the process flow of the present invention. Beginning from a start state, the process 100 proceeds to process block, where it receives the address signal 110. It then advances to decision block 115, where it determines if the corresponding access is a READ operation. If so, the process 100 proceeds to decision block 120, where it determines if the memory select bit is true or a "1". If so, the process proceeds to perform a read operation from the associated memory location, such as memory element 14a (process block 125). If, at decision block 120, it is determined that the memory select bit is not true, or a "0", the process 100 proceeds to process block 130, where it proceeds to perform a READ operation from the corresponding register location, such as memory element 14b.

If, at decision block 115, it was determined that the corresponding access is not a READ operation, but is instead a WRITE operation, the process 100 proceeds to decision block 135, where it determines if the memory select bit is true or a "1". If so, the process 100 proceeds to process block 140, where it performs a WRITE operation to the corresponding memory location, such as memory element 14a. If, at decision block 135, it was determined that the memory select bit is not true, or a "0", the process 100 proceeds to process block 145, where it proceeds to perform a WRITE operation to the corresponding register location, such as memory element 14b. After performing each process 125, 130, 140 or 145, the process 100 terminates.

Through the use of the present invention, an apparatus and method for selecting at least one of two separate functional spaces in a memory component is provided. In particular, the present invention facilitates selection of at least two separate functional spaces in a memory component without the need to add additional pins to a chip. The use of the present invention also prevents mapping of accesses to a register space to the same address space as the main memory.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An apparatus, comprising:
    a first functional memory space including a plurality of memory elements capable of being randomly accessed using a first portion of an address signal;
    a second functional memory space including a plurality of memory elements identified capable of being randomly accessed using said first portion of said address signal;
    a decoder to receive a second portion of said address signal which identifies which of said first or second function memory space is to be accessed, and to access data stored in a memory element identified by said first portion of said address signal, said memory element residing in the selected functional memory space.

2. The apparatus of claim 1, wherein said first functional memory space comprises a random access memory and said second functional memory space comprises a register element.

3. The apparatus of claim 2, wherein said second portion of said address signal includes a select bit having a first value representative of an access to or from said random access memory, and a second value representative of an access to or from the register element.

4. The apparatus of claim 3, wherein the access is a read operation.

5. The apparatus of claim 3, wherein the access is a write operation.

6. The apparatus of claim 1, wherein said decoder also receives a control signal having a first value indicating that the access is a read operation.

7. The apparatus of claim 6, wherein said control signal also includes a second value indicating that the access is a write operation.

8. A method, comprising:
   providing a first functional memory space including a plurality of memory elements capable of being randomly accessed using a first portion of an address signal;
   providing a second functional memory space including a plurality of memory elements identified capable of being randomly accessed using said first portion of said address signal;
   receiving an address signal having first and second portions, said second portion of said address signal selecting either said first or second functional memory space, and said first portion selecting a memory element within the selected functional memory space;
   performing an operation on said selected memory element.

9. The method of claim 8, wherein said first functional memory space comprises a random access memory and said second functional memory space comprises a register element.

10. The method of claim 9, wherein said second portion of said address signal includes a select bit having a first value representative of an access to or from said random access memory, and a second value representative of an access to or from the register element.

11. The method of claim 10, wherein the operation includes a read operation.

12. The method of claim 10, wherein the operation includes a write operation.

13. The method of claim 8, further comprising receiving a control signal having a first value indicating that the operation is a read operation.

14. The method of claim 13, further comprising receiving said control signal including a second value indicating that the operation is a write operation.

15. An system, comprising:
   a processor to generate an address signal including first and second portions thereof;
   a memory comprising:
      a first functional memory space including a plurality of memory elements capable of being randomly accessed using said first portion of said address signal;
      a second functional memory space including a plurality of memory elements identified capable of being randomly accessed using said first portion of said address signal;
      a decoder to receive said second portion of said address signal which identifies which of said first or second function memory space is to be accessed, and to perform an operation on a memory element identified by said first portion of said address signal within the selected functional memory space identified by said second portion of said address signal.

16. The system of claim 15, wherein said first functional memory space comprises a random access memory and said second functional memory space comprises a register element.

17. The system of claim 16, wherein said second portion of said address signal includes a select bit having a first value representative of an access to or from said random access memory, and a second value representative of an access to or from the register element.

18. The system of claim 17, wherein the access is a read operation.

19. The system of claim 15, wherein the access is a write operation.

20. The system of claim 15, wherein said decoder also receives a control signal having a first value indicating that the access is a read operation.

21. The system of claim 20, wherein said control signal also includes a second value indicating that the access is a write operation.

* * * * *

UNITED STATES PATENT AND TRADEMARK OFFICE
CERTIFICATE OF CORRECTION

PATENT NO. : 6,421,765 B1
DATED : July 16, 2002
INVENTOR(S) : Poisner

It is certified that error appears in the above-identified patent and that said Letters Patent is hereby corrected as shown below:

<u>Title page, Item [54] and Column 1, line 2,</u>
Title, delete "SELECTING FUNCTIONAL SPACE" and insert -- SELECTING A SEPARATE FUNCTIONAL SPACE --.

Signed and Sealed this

Twenty-eighth Day of January, 2003

JAMES E. ROGAN
*Director of the United States Patent and Trademark Office*